(12) United States Patent
Yan et al.

(10) Patent No.: US 8,867,364 B2
(45) Date of Patent: Oct. 21, 2014

(54) METHOD AND APPARATUS FOR MULTI-HOMING PATH SELECTION OF STREAM CONTROL TRANSMISSION PROTOCOL

(75) Inventors: Xincheng Yan, Shenzhen (CN); Xiaowei Ji, Shenzhen (CN); Changjiang Yang, Shenzhen (CN); Jingyuan Chen, Shenzhen (CN); Ying Tan, Shenzhen (CN); Jun Du, Shenzhen (CN); Aimin Wang, Shenzhen (CN); Jianye Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 193 days.

(21) Appl. No.: 13/522,496

(22) PCT Filed: Oct. 15, 2010

(86) PCT No.: PCT/CN2010/077781
§ 371 (c)(1),
(2), (4) Date: Jul. 16, 2012

(87) PCT Pub. No.: WO2011/113274
PCT Pub. Date: Sep. 22, 2011

(65) Prior Publication Data
US 2012/0294177 A1 Nov. 22, 2012

(30) Foreign Application Priority Data
Mar. 19, 2010 (CN) .......................... 2010 1 0147506

(51) Int. Cl.
| | |
|---|---|
| H04L 1/00 | (2006.01) |
| H04L 12/26 | (2006.01) |
| H04J 1/16 | (2006.01) |
| H04J 3/14 | (2006.01) |
| H04L 12/28 | (2006.01) |
| G06F 15/173 | (2006.01) |
| H04L 12/721 | (2013.01) |
| H04L 12/751 | (2013.01) |
| H04L 12/759 | (2013.01) |

(52) U.S. Cl.
CPC ................ H04L 45/12 (2013.01); H04L 45/10 (2013.01); H04L 45/028 (2013.01); H04L 45/02 (2013.01)

USPC .......... 370/237; 370/216; 370/217; 370/351; 709/239; 709/238

(58) Field of Classification Search
CPC ....... H04L 45/028; H04L 45/02; H04L 47/10; H04L 45/00; H04L 47/00
USPC ......... 370/328, 252, 216, 217, 221, 229, 232, 370/237, 254, 351, 352, 357, 389; 709/238, 709/239
See application file for complete search history.

(56) References Cited

U.S. PATENT DOCUMENTS

| | | |
|---|---|---|
| 2003/0235151 A1 | 12/2003 | McClellan |
| 2005/0003768 A1 | 1/2005 | Laroia et al. |

(Continued)

FOREIGN PATENT DOCUMENTS

| | | |
|---|---|---|
| CN | 1765135 A | 4/2006 |
| CN | 101808044 A | 8/2010 |
| EP | 1578160 A1 | 9/2005 |

OTHER PUBLICATIONS

International Search Report in international application No. PCT/CN2010/077781, mailed on Dec. 30, 2010.

(Continued)

Primary Examiner — Kwang B Yao
Assistant Examiner — Adam Duda
(74) Attorney, Agent, or Firm — Oppedahl Patent Law Firm LLC

(57) ABSTRACT

The present disclosure discloses a method for multi-homing path selection of a stream control transmission protocol (SCTP). The method includes the following steps of: starting quality evaluation of paths; calculating a quality evaluation value of each path; comparing the quality evaluation value of each path; and selecting a path with the highest quality evaluation value to transmit a data message. The present disclosure also discloses an apparatus for multi-homing path selection of an SCTP. By adopting the method and the apparatus, a network selects the path with the highest quality evaluation value to transmit a data message. As long as path faults affect the transmission efficiency, other path with better quality is selected for transmission, thus the capability of the network of dealing with all kinds of path faults can be improved, and the data transmission speed and quality are further improved.

13 Claims, 2 Drawing Sheets

(56) References Cited

U.S. PATENT DOCUMENTS

| | | | |
|---|---|---|---|
| 2005/0197131 A1 | 9/2005 | Ikegami | |
| 2007/0159977 A1* | 7/2007 | Dalal et al. | 370/238 |
| 2010/0144282 A1 | 6/2010 | Laroia et al. | |

OTHER PUBLICATIONS

English Translation of the Written Opinion of the International Search Authority in international application No. PCT/CN2010/077781, mailed on Dec. 30, 2010.

Stream Control Transmission Protocol, Sep. 2007.

Fracchia et al., IEEE Transactions on Mobile Computing, vol. 6, No. 10, WiSE: Best-Path Selection in Wireless Multihoming Environments, Oct. 1, 2007, 12 total pages, see Supplementary European Search Report.

Wikipedia, Exponential smoothing, Mar. 3, 2010, 4 total pages, see Supplementary European Search Report.

Wikipedia, Throughput, Mar. 12, 2010, 9 total pages, see Supplementary European Search Report.

Supplementary European Search Report in European application No. 10847743.1, mailed on Mar. 13, 2014.

Wikipedia, Stream Control Transmission Protocol, Mar. 1, 2010.

* cited by examiner

METHOD AND APPARATUS FOR MULTI-HOMING PATH SELECTION OF STREAM CONTROL TRANSMISSION PROTOCOL

TECHNICAL FIELD

The present disclosure relates to communication data transmission technologies, and in particular to a method and an apparatus for multi-homing path selection of a Stream Control Transmission Protocol (SCTP).

BACKGROUND

An SCTP is a most widely used transmission layer protocol in a communication network at present due to the multi-homing function of the SCTP to a great extent, which allows one SCTP connection to select and switch among a plurality of transmission paths, so that the fault-tolerance capacity of the network is improved.

The so-called multi-homing refers to that data transmission can be performed by one SCTP connection through a plurality of logic links of an Internet protocol (IP) layer among networks. Here, the logic link of the IP layer can also be referred to as a path; and there is a backup relationship between the paths, that is to say, if one path is interrupted, data can be switched to other reachable backup paths for transmission.

In the SCTP, a path fault is not only reflected by physical link interruption or unreachable routing, but also more reflected by worsened link quality, such as packet loss due to congestion, packet loss due to error codes, time delay increase, disorder or the like. In a related art, it is not ideal enough for the SCTP to deal with a link quality worsening situation. For example, path switching is performed only when a certain number of times of continuous message retransmissions is reached according to the requirement of the protocol. Under such condition, upon discontinuous interruption of the network or upon larger packet loss rate, a confirmed message may still be received after several attempts; here the number of attempts may not meet the requirement of the protocol. In this case, even if the network quality of a current path is deteriorated and service transmission is seriously affected, the SCTP may still insist on transmitting data on the original path but not selecting a backup path with better quality, thereby affecting the data transmission speed and quality.

Furthermore, the protocol further specifies that: if the current path is not a preferred path, then when the preferred path is reachable, namely, after a confirmed message or a heartbeat response message is received, the current path will be immediately switched back to the preferred path; here the preferred path is a default path of data transmission. However, the reception of a confirmed message or a heartbeat response message only shows that the network path is reachable, which does not mean the network quality of the preferred path is completely restored. Therefore, even if the preferred path is reachable, a network fault still occurs, data transmission in the case of SCTP coupling is seriously affected, accordingly. Here the SCTP coupling refers to a correspondence relationship between two SCTP ports between which a connection is established, that is to say, a network fault may seriously affect data transmission between two coupled SCTP ports.

It can be seen from the above that the current multi-homing path selection mechanism of the SCTP is designed based on the on and off attributes of a path without taking the impact of network quality of the path on data transmission speed and quality into consideration.

SUMMARY

In view of this, the present disclosure mainly aims to provide a method and an apparatus for multi-homing path selection of an SCTP, for overcoming the defects that the impact of network quality of a path on the data transmission speed and quality is not taken into consideration in a multi-homing path selection mechanism of the existing SCTP.

To achieve the above purpose, the technical solution of the present disclosure is realized in this way:

a method for multi-homing path selection of an SCTP includes:

starting quality evaluation of paths, and calculating a quality evaluation value of each path;

comparing the quality evaluation value of each path, and selecting a path with a highest quality evaluation value to transmit a data message.

In the above solution, the method may further include: when two or more paths have same quality evaluation values and the paths with the same quality evaluation values comprise a preferred path, a network device firstly selects the preferred path to transmit a data message, and then selects a current path to transmit a data message, and finally selects other path to transmit a data message;

when two or more paths have same quality evaluation values and the paths with the same quality evaluation values do not comprise the preferred path, the network equipment firstly selects the current path to transmit a data message.

In the above solution, a factor which triggers the calculating of a quality evaluation value of each path may include one or any combination of: timer timeout, event trigger, network congestion, and reaching of a preset number of times of retransmissions.

In the above solution, the starting quality evaluation of paths and calculating a quality evaluation value Q(P) of each path may be:

a quality evaluation value $Q(P)$ of the current path= $(1-a)Q+a(R/S)$;

wherein the S is the number of transmitted data packets, and after a timer is started, 1 is added to the S every time one data packet is transmitted; and the R is the number of confirmed data packets, and 1 is added to the R every time one data packet is confirmed;

the Q is a Q(P) value obtained after the path transmits a heartbeat message last time;

calculation of a quality evaluation value Q(P) of other path is: every time the network device receives an effective heartbeat response message, the Q(P) value is updated to: $Q(P)=(1-a)Q+a$; when no heartbeat response message is received within a specified time, the Q(P) value is updated to: $Q(P)=(1-a)Q$;

the Q(P) value of other path is obtained according to a receiving situation of a heartbeat response message;

a value of the a is taken from a range which is greater than 0.01 and smaller than 0.1.

In the above solution, the starting quality evaluation of paths and calculating a quality evaluation value H(P) of each path may be:

$$H(P)=PMTU/(SRTT \times (Q)^{0.5}+0.001);$$

the PMTU represents a path maximum transmission unit; the SRTT represents a smooth round-trip cycle; the Q represents a packet loss rate of a path; and the $(Q)^{\wedge} 0.5$ represents a square root of the packet loss rate;

calculation of a Q value of the current path is: $Q=(1-a)Q+a(R/S)$;

the S is the number of transmitted data packets, and after the timer is started, 1 is added to the S every time one data packet is transmitted; and the R is the number of confirmed data packets, and 1 is added to the R every time one data packet is confirmed;

calculation of a Q value of other path is: every time the network device receives an effective heartbeat response message, the Q value is updated to: $Q=(1-a)Q+a$; when no heartbeat response message is received within a specified time, the Q value is updated to: $Q=(1-a)Q$;

the Q value of other path is obtained according to a receiving situation of a heartbeat response message; and a value of the a is taken from a range which is greater than 0.01 and smaller than 0.1.

In the above solution, the starting quality evaluation of paths and calculating a quality evaluation value H (P) of each path may be:

$H(P)=PMTU/(T\times(Q)^{\wedge}0.5+0.001)$;

T represents a time delay of a path.

In the above solution, a calculation method of the Q may include:

transmitting path quality detection heartbeat messages to each path after the timer is started;

recording the number S of path quality detection heartbeat messages transmitted on each path, and the number R of corresponding received path quality detection heartbeat response messages; and calculating a packet loss rate Q of the each path according to $Q=R/S$ after the timer is overtime.

In the above solution, a calculation method of the T value may include:

$ST_n=ST_{n-1}+(T_2-T_1)$; after the timer is overtime, the path transmits n path quality detection heartbeat messages, obtains an accumulated transmission time delay $ST_n$ of the n path quality detection heartbeat messages, and obtains a T value of the path according to $T=ST_n/R$.

The present disclosure further provides an apparatus for multi-homing path selection of an SCTP, wherein the apparatus includes: a calculation module, a comparison module and a path selection module; wherein the calculation module is configured to start quality evaluation of paths, calculate a quality evaluation value of each path, and transmit the quality evaluation value of each path calculated to the comparison module;

the comparison module is configured to, after receiving the quality evaluation value transmitted by the calculation module, compare the quality evaluation value of each path, and transmit a path with a highest quality evaluation value to the path selection module; and the path selection module is configured to select the path with the highest quality evaluation value to transmit a data message after receiving the path with the highest quality evaluation value transmitted by the comparison module.

In the above solution, when two or more paths have same quality evaluation values and the paths with the same quality evaluation values comprise a preferred path, the path selection module firstly selects the preferred path to transmit a data message, and then selects a current path to transmit a data message, and finally selects other path to transmit a data message;

when two or more paths have same quality evaluation values and the paths with the same quality evaluation values do not comprise the preferred path, the path selection module firstly selects the current path to transmit a data message, and then selects other path to transmit a data message.

By the method and the apparatus for multi-homing path selection of an SCTP provided by the present disclosure, quality evaluation values of paths are calculated and compared, and a path with the highest quality evaluation value is selected by a network to transmit a data message. As long as a path fault affects the transmission efficiency, other path with better quality is selected for transmission, thus the capability of the network of dealing with all kinds of path faults can be improved, and the data transmission speed and quality are further improved. On the other hand, a preferred path is switched back for data transmission only when the quality evaluation value of the preferred path is maximum among all the paths, thus the problem of slow data transmission speed in the existing SCTP because the preferred path is switched back as long as a confirmed message is received can be solved.

DETAILED DESCRIPTION

The present disclosure is described below with reference to the accompanying drawings and specific embodiments in detail.

Figure 1:
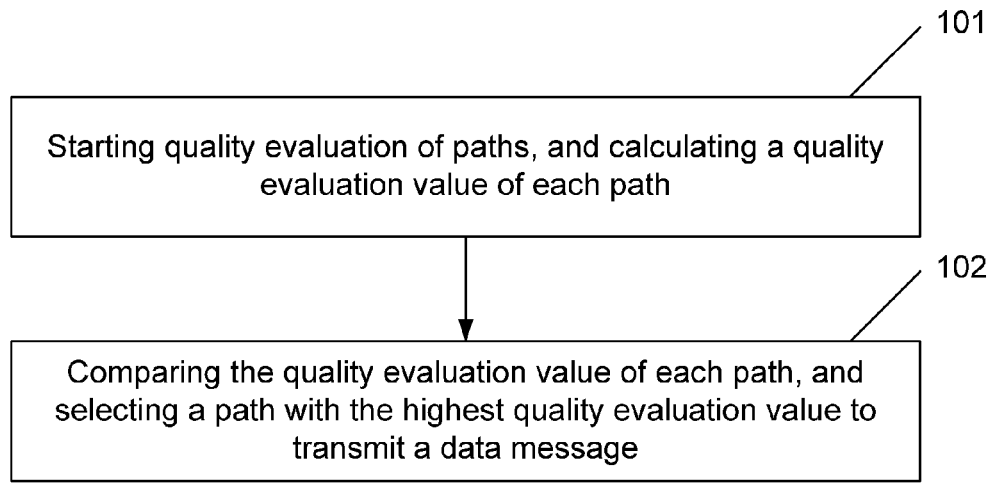
FIG. 1 shows a schematic diagram of a flow of a method for realizing multi-homing path selection of an SCTP of the present disclosure.

The method for realizing multi-homing path selection of an SCTP of the present disclosure is shown in FIG. 1, comprising the following steps of:

step 101: starting quality evaluation of paths, and calculating a quality evaluation value of each path;

here, a factor which triggers the calculating of a quality evaluation value of each path may either be timer timeout or event trigger, such as reception of a message; if the timer timeout is taken as a necessary condition, then the duration of the timer and the moment for starting triggering should be set before the timer is started; the factor can also be worsening of transmission quality, such as congestion, or reaching of a preset number of times of retransmissions, wherein the preset number of times can be set according to the specification of the existing protocol; and the factor can also be any combination of the four factors, namely timer timeout, event trigger, network congestion and reaching of a preset number of times of retransmissions, for example, the factor for triggering can be timer timeout as well as the reaching of the preset number of times of retransmissions;

generally, the starting of triggering of the timer and the duration of the timer can adopt the triggering principle and the duration of a timer which is used in heartbeat message transmission in the existing SCTP; the specifications of RFC2960 and RFC4960 can be referred to for details; and all the paths can share one timer;

and step 102: comparing the quality evaluation value of each path, and selecting a path with the highest quality evaluation value to transmit a data message;

here, when two or more paths have the same quality evaluation values, and the paths with the same quality evaluation values comprise a preferred path, a network device firstly selects the preferred path to transmit a data message, and then selects a current path to transmit a data message, and finally selects other path to transmit a data message; and when the paths with the same quality evaluation values do not comprise a preferred path, the network equipment should firstly select the current path to transmit a data message;

the current path refers to a path used by the network currently to transmit a data message.

The network device comprises a router, a gateway, a switch, a wireless network controller, a base station, a mobile terminal and other network element devices in various communication networks.

In general, factors affecting path network quality comprise: a packet loss rate, time delay magnitude and a change trend thereof, a disorder degree for transmitting and receiving data messages, a network bandwidth, a backlog degree of transmitting/receiving queues of the SCTP, a service call loss, or the like. A user can select part of the factors according to a requirement, and define an appropriate evaluation function according to the selected factors to calculate a quality evaluation value.

Figure 2:
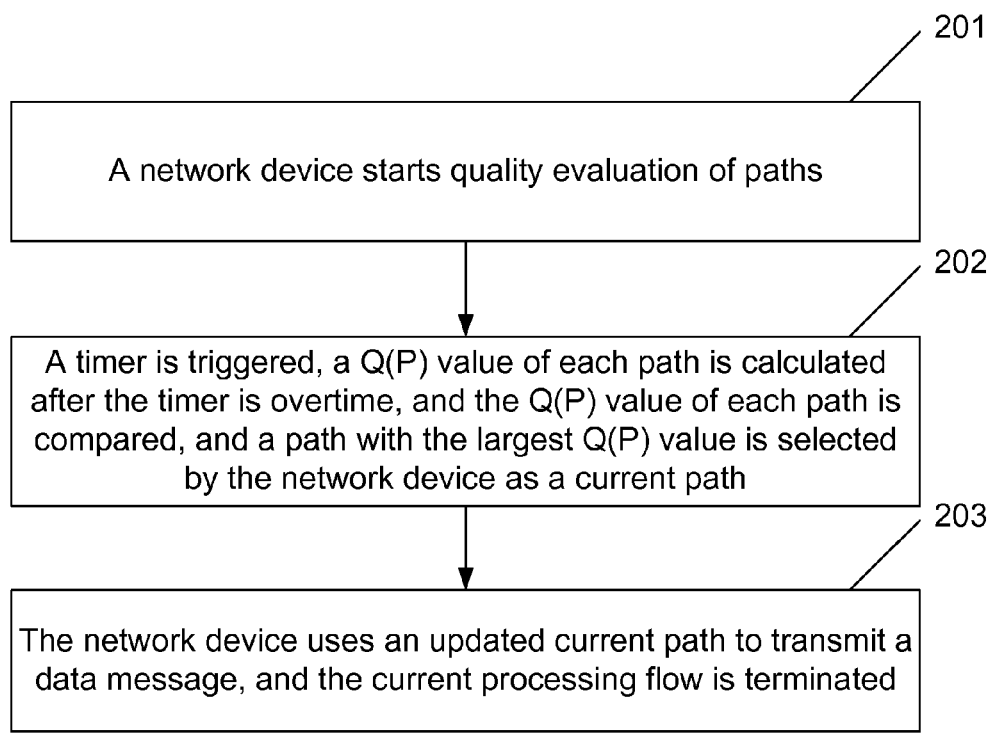
FIG. 2 shows a schematic diagram of a flow of implementing the method according to Embodiment 1.

Embodiment 1:

The packet loss rate of a path is selected as the factor affecting path network quality in this embodiment, and an evaluation function is defined based on it, so that a network can select a path with the smallest packet loss rate as a path to transmit data. A method for the network device to select a path with the smallest packet loss rate as a path to transmit data is shown in FIG. 2, comprising the following steps.

Step 201: The network device starts quality evaluation of paths.

Here, the SCTP can be provided with, or not provided with the multi-homing function. Generally, the SCTP is configured with the multi-homing function in a practical application; correspondingly, after the SCTP is configured with the multi-homing function, the quality evaluation of paths is started; and if the SCTP is not provided with the multi-homing function, the quality evaluation of paths is not needed to be started.

A quality evaluation value of a path P is represented by Q(P); for a confirmed path, an initial Q(P) value is set to 1; and for an unconfirmed path, the initial Q(P) value is set to 0;

the confirmed path refers to a confirmed reachable path, and the unconfirmed path refers to a confirmed unreachable path.

Step 202: A timer is triggered, a Q(P) value of each path is calculated after the timer is overtime, the Q(P) value of each path is compared, and a path with the largest Q(P) value is selected by the network device as a current path;

here, the starting of triggering of the timer and the duration of the timer can adopt the triggering principle and the duration of a timer which is used in heartbeat message transmission in the existing SCTP; the specifications of RFC2960 and RFC4960 can be referred to for details;

a packet loss rate of the current path refers to a packet loss rate of data messages, and a packet loss rate of other path refers to a packet loss rate of heartbeat messages;

the calculation of a Q(P) value of the current path is: $Q(P)=(1-a)Q+a(R/S)$;

wherein the a is a smoothing parameter, the reciprocal of the a can be approximately interpreted as the number of transmitted messages which affects an evaluation result. For example, if a=0.01, it means that the Q(P) value is obtained from a packet loss rate of recent 100 messages, and a value range of the a is 0<a<1; to make a packet loss rate of a path be more correctly and quickly reflected by Q(P), a value of the a can be preferably taken from a range 0.01<a<0.1;

the S is the number of data packets transmitted on the current path, the detailed explanation of the S can be seen in a RFC4960 file; after the timer is started, 1 is added to the S every time one data packet is transmitted;

the R is the number of data packets confirmed on the current path; after the timer is started, 1 is added to the R every time one data packet is confirmed; every time a receiving end receives one data packet, it returns one corresponding confirmed data packet to the network.

After the timer is overtime, the Q(P) value of the current path is calculated according to confirmed S and R values; and after the Q(P) value of the current path is calculated, the S and R values are cleared.

The calculation of Q(P) value of other path is: after the timer is started, every time the network device receives an effective heartbeat response message, the Q(P) value is updated to: $Q(P)=(1-a)Q+a$; when no heartbeat response message is received within a specified time, the Q(P) value is updated to: $Q(P)=(1-a)Q$.

Here, a value of the a is the same as a value of a in the calculation of Q(P) value of the current path; the effective heartbeat response message refers to a heartbeat response message received within the time specified by the SCTP; the Q(P) value of other path is updated every time a heartbeat message is transmitted; during update, the Q value on the right sides of the formulae is a Q value obtained after a path transmits a heartbeat message last time.

After the timer is overtime, the Q(P) value of other path is obtained according to a receiving situation of a heartbeat response message.

In the process of calculating a Q(P) value of a path, if a certain path is interrupted, the Q(P) value of the certain path is set to 0;

when two or more paths have the same quality evaluation values, the network device selects the preferred path firstly to transmit a data message, and then selects the current path to transmit a data message, and finally selects other path to transmit a data message; when the paths with the same quality evaluation values do not comprise the preferred path, the network device should firstly select the current path to transmit a data message.

And step 203: The network device uses an updated current path to transmit a data message, and the current processing flow is terminated.

Embodiment 2:

In this embodiment, a user selects a packet loss rate of a path, time delay magnitude, and a Path Maximum Transmission Unit (PMTU) as the factors affecting path network quality, and an evaluation function is defined as:

$$H(P)=PMTU/(SRTT \times (Q)^{0.5}-0.001);$$

wherein the H(P) can represent the maximum transmission capacity of a path; the PMTU represents the path maximum transmission unit, and a PMTU value of each path can be obtained with reference to a RFC1191 file; the SRTT represents a smooth round-trip cycle, used for measuring a time delay of a recent path, and is one of basic parameters of the SCTP, wherein an SRTT value of each path can be obtained with reference to the RFC4960 file; the Q represents a packet loss rate of the path; and the $(Q)^{0.5}$ represents the square root of a packet loss rate.

Here, the calculation of a Q value of a current path is: $Q=(1-a)Q+a(R/S)$;

wherein the a is a smoothing parameter, the reciprocal of the a can be approximately interpreted as the number of transmitted messages affecting an evaluation result. For example, if a=0.01, the Q value is obtained from a packet loss rate of recent 100 messages, and a value of the a is taken from a range 0<a<1; to make the packet loss rate of the path be more correctly and quickly reflected by Q, a value of the a is preferably taken from a range 0.01<a<0.1;

the S is the number of data packets transmitted on the current path, the detailed explanation of the S can be seen in the RFC4960 file; after a timer is started, 1 is added to the S every time one data packet is transmitted;

the R is the number of data packets confirmed on the current path; after the timer is started, 1 is added to the R every time one data packet is confirmed; every time a receiving end receives one data packet, it returns one corresponding confirmed data packet to the network.

After the timer is overtime, a Q value of the current path is calculated according to confirmed S and R values; and after the Q value of the current path is calculated, the S and R values are cleared.

The calculation of a Q value of other path is: after the timer is started, every time the network device receives an effective heartbeat response message, the Q value is updated to: Q=(1−a)Q+a; when no heartbeat response message is received within a specified time, the Q value is updated to: Q=(1−a)Q.

Here, a value of the a is the same as a value of the a in the calculation of a Q value of the current path; the effective heartbeat response message refers to a heartbeat response message received within the time specified by the SCTP; the Q value of other path is updated once every time a heartbeat message is transmitted; during update, the Q value on the right sides of the formulae is a Q value obtained after the path transmits a heartbeat message last time.

After the timer is overtime, the Q value of other path is obtained according to a receiving situation of a heartbeat response message; the starting of triggering of the timer and the duration of the timer can adopt the triggering principle and the duration of a timer which is used in heartbeat message transmission in the existing SCTP; the specifications of RFC2960 and RFC4960 files can be referred to for details;

0.001 is set as the denominator in division for preventing overflow when a packet loss rate is 0.

In the two methods for obtaining an quality evaluation value described above, a quality evaluation value of a path is obtained by transmitting and receiving data or heartbeat response messages on the path, therefore the network device can be considered to obtain a quality evaluation value of a path passively.

Embodiment 3:

In this embodiment, the network device acquires a quality evaluation value of a path by adopting a special detection heartbeat message. Specifically, a user still selects a packet loss rate of a path, time delay magnitude, and a PMTU of the path as the factors affecting path network quality, and an evaluation function is defined as:

$$H(P)=PMTU/(T \times (Q)^{\wedge}0.5+0.001);$$

wherein the H(P) can represent the maximum transmission capacity of the path;

the PMTU represents the path maximum transmission unit; the T represents a time delay of the path; Q represents a packet loss rate of the path, and $(Q)^{\wedge}0.5$ represents the square root of the packet loss rate.

Figure 3:
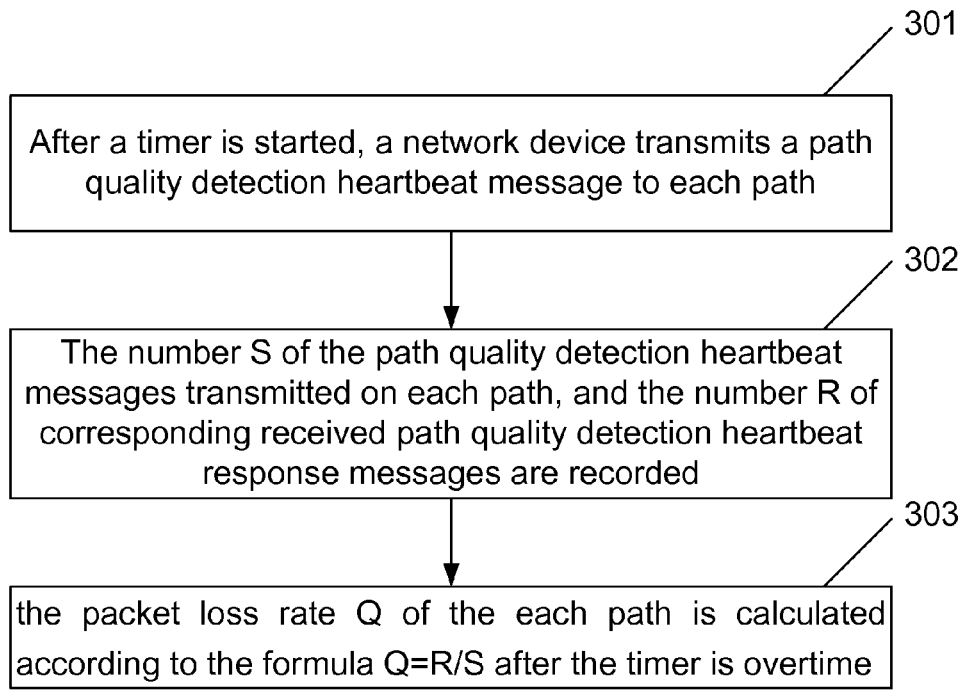
FIG. 3 shows a schematic diagram of a flow of a method for calculating a packet loss rate in Embodiment 3.

Here, a method for calculating the Q value is shown in FIG. 3, comprising the following steps:

step 301: after a timer is started, the network device transmits a path quality detection heartbeat message to each path;

here, the starting of triggering of the timer and the duration of the timer can adopt the triggering principle and the duration of a timer which is used in heartbeat message transmission in the existing SCTP; the specifications of RFC2960 and RFC4960 can be referred to for details;

the existing SCTP specifies that a heartbeat message is not needed to be transmitted when a data message is transmitted. Different from the existing SCTP, the path quality detection heartbeat message is transmitted on all the paths in the present disclosure, so that each path has the same sampling model;

the path quality detection heartbeat message can define a new heartbeat type so as to distinguish the heartbeat message in the existing SCTP. Specifically, the new heartbeat type can be defined with reference to a specified format in RFC4960; the path quality detection heartbeat message is selected as large as possible, for example, close to the size of the PMTU, so as to ensure the reliability to obtain an H value; the reachability of the path quality detection heartbeat message will not affect the on/off counting of the path;

step 302: the number S of the path quality detection heartbeat messages transmitted on each path and the number R of corresponding received path quality detection heartbeat response messages are recorded;

here, to ensure the reliability of a detection result, an S value should be the number of sufficient detection messages, for example, a numerical value from 10 to 100;

step 303: a packet loss rate Q of the each path is calculated according to a formula Q=R/S after the timer is overtime.

Here, the starting of triggering of the timer and the duration of the timer can adopt the triggering principle and the duration of a timer which is used in heartbeat message transmission in the existing SCTP; the specifications of RFC2960 and RFC4960 files can be referred to for details.

The calculation method of the T value is specifically: $ST_n=ST_{n-1}+(T_2-T_1)$, wherein the $ST_n$ represents an accumulated transmission time delay, $T_1$ represents a time stamp of transmission of a path quality detection heartbeat message, which is included in the path quality detection heartbeat message to be transmitted; $T_2$ represents the time of receiving the path quality detection heartbeat response message;

after the timer is started, an Initial Retransmission Timeout value is selected as an initial ST value; the Initial Retransmission Timeout value may be a specific numerical value obtained from the RFC4960 file;

after the timer is overtime, the path transmits n path quality detection heartbeat messages, obtains the accumulated transmission time delay of the n path quality detection heartbeat messages, and obtains a T value of the path according to $T=ST_n/R$.

Here, after the Q value and T value of the path are calculated, the S, R and $ST_n$ values are cleared, and an H(P) value of the path is further calculated according to the calculated Q value and T value.

The RFC in the above solution refers to a Request for Comments, which is a series of numbered files. The file collects relevant information about Internet, and software files of UNIX and Internet community, for example, RFC1191 is a file related to PMTU, and how to determine a PMTU value of each path can be found here.

Figure 4:
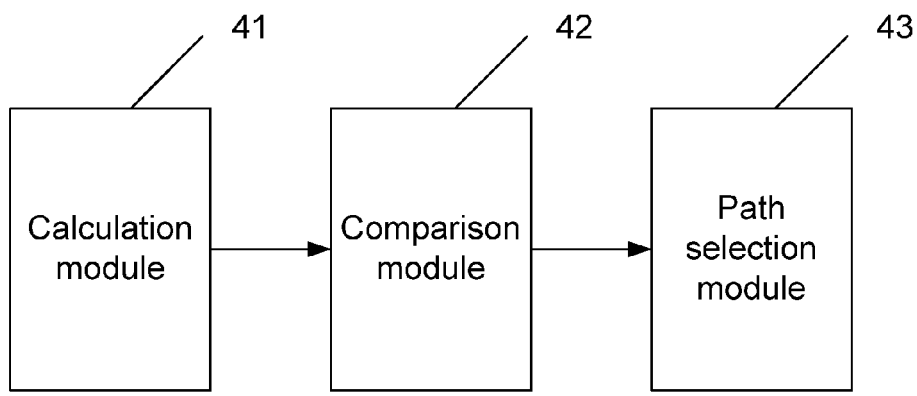
FIG. 4 shows a schematic diagram of a structure of an apparatus for realizing multi-homing path selection of an SCTP of the present disclosure.

To implement the above method, the present disclosure further provides an apparatus for multi-homing path selection of SCTP as shown in FIG. 4, wherein the apparatus comprises a calculation module 41, a comparison module 42 and a path selection module 43; wherein the calculation module 41 is configured to start quality evaluation of paths, calculate a quality evaluation value of each path, and transmit the quality evaluation value of each path calculated to the comparison module 42;

the comparison module 42 is configured to, after receiving the quality evaluation value transmitted by the calculation module 41, compare the quality evaluation value of each path, and transmit a path with the highest quality evaluation value to the path selection module 43; and the path selection module 43 is configured to select the path with the highest quality evaluation value to transmit a data message after receiving the path with the highest quality evaluation value transmitted by the comparison module 42.

Wherein the calculation module 41 can define an appropriate evaluation function according to selected part of factors affecting path network quality, in order to calculate a quality evaluation value;

When two or more paths have the same quality evaluation values, the path selection module 43 firstly selects a preferred path to transmit a data message, and then selects a current path to transmit a data message, and finally selects other path to transmit a data message; when the paths with the same quality evaluation values do not comprise the preferred path, the path selection module 43 firstly selects the current path to transmit a data message, and then selects other path to transmit a data message.

The above are only preferred embodiments of the present disclosure and not intended to limit the scope of protection of the present disclosure. Any modifications, equivalent replacements, improvements or the like within the spirit and principle of the present disclosure shall fall within the scope of protection of the present disclosure.

The invention claimed is:

1. An apparatus for multi-homing path selection of a Stream Control Transmission Protocol (SCTP), comprising: a calculation module, a comparison module and a path selection module; wherein the calculation module is configured to start quality evaluation of paths, calculate a quality evaluation value of each path, and transmit the quality evaluation value of each path calculated to the comparison module;

the comparison module is configured to, after receiving the quality evaluation value transmitted by the calculation module, compare the quality evaluation value of each path, and transmit a path with a highest quality evaluation value to the path selection module; and the path selection module is configured to select the path with the highest quality evaluation value to transmit a data message after receiving the path with the highest quality evaluation value transmitted by the comparison module;

wherein when two or more paths have same quality evaluation values and paths with the same quality evaluation values comprise a preferred path, the path selection module firstly selects the preferred path to transmit a data message, and then selects a current path to transmit a data message, and finally selects other path to transmit a data message;

when two or more paths have same quality evaluation values and paths with the same quality evaluation values do not comprise the preferred path, the path selection module firstly selects the current path to transmit a data message, and then selects other path to transmit a data message.

2. A method for multi-homing path selection of a Stream Control Transmission Protocol (SCTP), comprising:

starting quality evaluation of paths by a network device, and calculating a quality evaluation value of each path;

comparing the quality evaluation value of each path, and selecting a path with a highest quality evaluation value to transmit a data message;

the method further comprises: when two or more paths have same quality evaluation values and paths with the same quality evaluation values comprise a preferred path, the network device firstly selects the preferred path to transmit a data message, and then selects a current path to transmit a data message, and finally selects other path to transmit a data message;

when two or more paths have same quality evaluation values and paths with the same quality evaluation values do not comprise the preferred path, the network device firstly selects the current path to transmit a data message.

3. The method according to claim 2, wherein a factor which triggers the calculating of a quality evaluation value of each path comprises one or any combination of: timer timeout, event trigger, network congestion, and reaching of a preset number of times of retransmissions.

4. The method according to claim 3, wherein the starting quality evaluation of paths and calculating a quality evaluation value Q (P) of each path is:

$$\text{a quality evaluation value Q(P) of a current path} = (1-a)Q + a(R/S);$$

wherein the S is a number of transmitted data packets, and after a timer is started, 1 is added to the S every time one data packet is transmitted; and the R is a number of confirmed data packets, and 1 is added to the R every time one data packet is confirmed;

the Q is a Q(P) value obtained after a path transmits a heartbeat message last time;

calculation of a quality evaluation value Q(P) of other path is: every time a network device receives an effective heartbeat response message, the Q(P) value is updated to: $Q(P)=(1-a)Q+a$; when no heartbeat response message is received within a specified time, the Q(P) value is updated to: $Q(P)=(1-a)Q$;

the Q(P) value of other path is obtained according to a receiving situation of a heartbeat response message;

a value of the a is taken from a range which is greater than 0.01 and smaller than 0.1.

5. The method according to claim 3, wherein the starting quality evaluation of paths and calculating a quality evaluation value H(P) of each path is:

$$H(P)=PMTU/(SRTT \times (Q)^{0.5} + 0.001);$$

the PMTU represents a path maximum transmission unit; the SRTT represents a smooth round-trip cycle; the Q represents a packet loss rate of a path; and $(Q)^{0.5}$ represents a square root of the packet loss rate;

calculation of a Q value of a current path is: $Q=(1-a)Q+a(R/S)$;

the S is a number of transmitted data packets, and after a timer is started, 1 is added to the S every time one data packet is transmitted; and the R is a number of confirmed data packets, and 1 is added to the R every time one data packet is confirmed;

calculation of a Q value of other path is: every time a network device receives an effective heartbeat response message, the Q value is updated to: $Q=(1-a)Q+a$; when no heartbeat response message is received within a specified time, the Q value is updated to: $Q=(1-a)Q$;

the Q value of other path is obtained according to a receiving situation of a heartbeat response message; and a value of the a is taken from a range which is greater than 0.01 and smaller than 0.1.

6. The method according to claim 3, wherein the starting quality evaluation of paths and calculating a quality evaluation value H (P) of each path is:

$$H(P)=PMTU/(T\times(Q)^{\wedge}0.5+0.001);$$

the T represents a time delay of a path.

7. The method according to claim 6, wherein a calculation method of the Q comprises:
transmitting path quality detection heartbeat messages to each path after a timer is started;
recording a number S of path quality detection heartbeat messages transmitted on each path, and a number R of corresponding received path quality detection heartbeat response messages; and
calculating a packet loss rate Q of the each path according to Q=R/S after the timer is overtime.

8. The method according to claim 6, wherein a calculation method of the T value comprises: $ST_n=ST_{n-1}+(T_2-T_1)$;
after a timer is overtime, a path transmits n path quality detection heartbeat messages, obtains an accumulated transmission time delay $ST_n$ of the n path quality detection heartbeat messages, and obtains a T value of the path according to $T=ST_n/R$.

9. The method according to claim 2, wherein the starting quality evaluation of paths and calculating a quality evaluation value Q(P) of each path is:

$$\text{a quality evaluation value Q(P) of a current path} = (1-a)Q+a(R/S);$$

wherein the S is a number of transmitted data packets, and after a timer is started, 1 is added to the S every time one data packet is transmitted; and the R is a number of confirmed data packets, and 1 is added to the R every time one data packet is confirmed;
the Q is a Q(P) value obtained after a path transmits a heartbeat message last time;
calculation of a quality evaluation value Q(P) of other path is: every time a network device receives an effective heartbeat response message, the Q(P) value is updated to: Q(P)=(1−a)Q+a; when no heartbeat response message is received within a specified time, the Q(P) value is updated to: Q(P)=(1−a)Q;
the Q(P) value of other path is obtained according to a receiving situation of a heartbeat response message;
a value of the a is taken from a range which is greater than 0.01 and smaller than 0.1.

10. The method according to claim 2, wherein the starting quality evaluation of paths and calculating a quality evaluation value H(P) of each path is:

$$H(P)=PMTU/(SRTT\times(Q)^{\wedge}0.5+0.001);$$

the PMTU represents a path maximum transmission unit; the SRTT represents a smooth round-trip cycle; the Q represents a packet loss rate of a path; and (Q)^0.5 represents a square root of the packet loss rate;
calculation of a Q value of a current path is: Q=(1−a)Q+a (R/S);
the S is a number of transmitted data packets, and after a timer is started, 1 is added to the S every time one data packet is transmitted; and the R is a number of confirmed data packets, and 1 is added to the R every time one data packet is confirmed;
calculation of a Q value of other path is: every time a network device receives an effective heartbeat response message, the Q value is updated to: Q=(1−a)Q+a; when no heartbeat response message is received within a specified time, the Q value is updated to: Q=(1−a)Q;
the Q value of other path is obtained according to a receiving situation of a heartbeat response message; and
a value of the a is taken from a range which is greater than 0.01 and smaller than 0.1.

11. The method according to claim 2, wherein the starting quality evaluation of paths and calculating a quality evaluation value H (P) of each path is:

$$H(P)=PMTU/(T\times(Q)^{\wedge}0.5+0.001);$$

the T represents a time delay of a path.

12. The method according to claim 11, wherein a calculation method of the Q comprises:
transmitting path quality detection heartbeat messages to each path after a timer is started;
recording a number S of path quality detection heartbeat messages transmitted on each path, and a number R of corresponding received path quality detection heartbeat response messages; and
calculating a packet loss rate Q of the each path according to Q=R/S after the timer is overtime.

13. The method according to claim 11, wherein a calculation method of the T value comprises: $ST_n=ST_{n-1}+(T_2-T_1)$;
after a timer is overtime, a path transmits n path quality detection heartbeat messages, obtains an accumulated transmission time delay $ST_n$ of the n path quality detection heartbeat messages, and obtains a T value of the path according to $T=ST_n/R$.

* * * * *